United States Patent [19]

Bubacz et al.

[11] 4,006,301

[45] Feb. 1, 1977

[54] YOKE ADJUSTING APPARATUS FOR A COLOR TV PICTURE TUBE

[75] Inventors: Dennis S. Bubacz; Guenter F. Hoffmann; Konrad L. Schiecke, all of Chicago, Ill.

[73] Assignee: Zenith Radio Corporation, Chicago, Ill.

[22] Filed: Jan. 16, 1976

[21] Appl. No.: 649,892

[52] U.S. Cl. .................................. 358/248; 335/212

[51] Int. Cl.[2] .......................................... H04N 5/657

[58] Field of Search ..................... 178/7.81; 335/212

[56] References Cited

UNITED STATES PATENTS

| | | | |
|---|---|---|---|
| 3,657,674 | 4/1972 | Goldammer | 335/212 |
| 3,810,053 | 5/1974 | McGlashan | 335/212 |
| 3,906,419 | 9/1975 | Bissinger | 178/7.81 |
| 3,950,720 | 4/1976 | Shrader | 178/7.81 |

*Primary Examiner*—Howard W. Britton
*Attorney, Agent, or Firm*—John R. Garrett

[57] ABSTRACT

This disclosure depicts a novel yoke adjusting apparatus for tilting a yoke relative to a central axis of a color television picture tube having a funnel with a flared portion and a neck containing an inline electron gun assembly. The yoke adjusting apparatus is illustrated as comprising; a circumferential support about the neck of the funnel and attached to the flared portion, a tilt adjusting means carried by the circumferential support for selectably positioning the yoke, a locking means for locking the tilt adjusting means in any selected position, and a manually operable means for releasing the locking means to free the tilt adjusting means and thereby enable it to be retracted and the yoke readjusted. The apparatus provides for simplicity and economy in readjusting the yoke at a later point in time after the initial adjustment.

7 Claims, 3 Drawing Figures

YOKE ADJUSTING APPARATUS FOR A COLOR TV PICTURE TUBE

BACKGROUND OF THE INVENTION

This invention relates in general to a yoke adjusting apparatus for use with a color television picture tube having a funnel and a mating faceplate.

Conventionally, the funnel of a color television picture tube has a neck attached to a flared portion ending in what is generally termed a mouth, to which the faceplate is attached. The neck contains an electron gun assembly for emitting three streams of electrons which excite a phosphor screen deposited on the faceplate. A yoke is provided for insuring that the stream of electrons will impinge on the phosphor screen at the exact location desired for proper convergence. The yoke is composed of four coils of wire which magnetically deflect the electron beam and is held in a yoke mount.

The yoke and yoke mount are attached to and surround the neck of the color television picture tube adjacent to the flared portion of the funnel. After the yoke is positioned on the neck of the funnel it is necessary to tilt the yoke until the desired alignment of the stream of electrons is achieved. A prior art method of tilting the yoke is to position discrete wedges between the yoke mount and the funnel. These wedges are moved about until the yoke is in its desired position. When the alignment of the yoke is complete, the wedges are cemented to the funnel. This poses a tremendous problem in readjusting the yoke at a later date, which may be necessary due to aging of the tube or any vibrations to which the tube may be subjected.

An apparatus for holding a yoke in a desired relationship with a tube is disclosed in U.S. Pat. No. 3,786,185 to Shrader, wherein a platform with projections is adhered to a tube funnel and wherein a yoke housing has indentations. Each of the projections is within and spaced from each of the indentations. In one embodiment an adhesive material is inserted between the projections and the indentations. In an alternative embodiment the projections are threaded and an adjustment means on the yoke housing engages the threaded projections.

OTHER PRIOR ART

See U.S. Pat. Nos.: 3,637,930; 3,688,231; 3,697,909; 3,829,804; 3,906,419.

OBJECTS

It is an object of the present invention to provide for a color television picture tube with a yoke and a yoke mount, an improved yoke adjusting apparatus for tilting the yoke relative to a central axis of the tube.

It is another object of this invention to provide a yoke adjusting apparatus for a color television picture tube which allows for quick alignment and readjustability of the yoke, and yet which is simple to use and inexpensive.

It is yet another object of the present invention to provide for releasably locking the tilt adjusting means.

DESCRIPTION OF THE PREFERRED EMBODIMENT

This invention pertains to an apparatus for adjusting a yoke on a color television picture tube. Conventionally, a color television picture tube has a funnel and a mating faceplate. The funnel has a neck which contains an inline electron gun assembly for emitting at least one stream of electrons. The neck is connected to a flared portion ending in a mouth to which the faceplate is attached. A yoke, which encircles the funnel neck, deflects the stream of electrons across the faceplate. Typically, the yoke is composed of four coils of wire which magnetically control the displacement of the stream of electrons and which are held in place by a yoke mount. The yoke mount with the supported yoke is on the neck of the funnel against the flared portion of the funnel. In order to properly align the stream of electrons from the inline electron gun assembly for achieving the proper convergence, it is necessary to tilt the yoke.

By this invention a simple and inexpensive apparatus overcomes the problem of yoke adjustment set-up time, a problem that has long been associated with the assembly and set-up time of color television picture tubes.

In accordance with this invention the yoke adjusting apparatus comprises a circumferential support located about the funnel neck and attached to the flared portion of the funnel. At least one tilt adjusting means is carried by the circumferential support and has a wedge-shaped portion which is selectively positionable between the yoke mount and the flared portion of the funnel. This tilt adjusting means varies the attitude of the yoke and, therefore, the magnitude of the yoke's magnetic field relative to a central axis of the tube. The tilt adjusting means is capable of being retracted, thus overcoming a significant problem in the prior art. A locking means coupled between the circumferential support and the tilt adjusting means locks the tilt adjusting means in a selected position between the yoke mount and the flared portion of the funnel corresponding to a desired attitude of the yoke, and thus of the yoke. Finally, a manually operable means is provided for releasing the locking means to free the tilt adjusting means.

Figure 1:
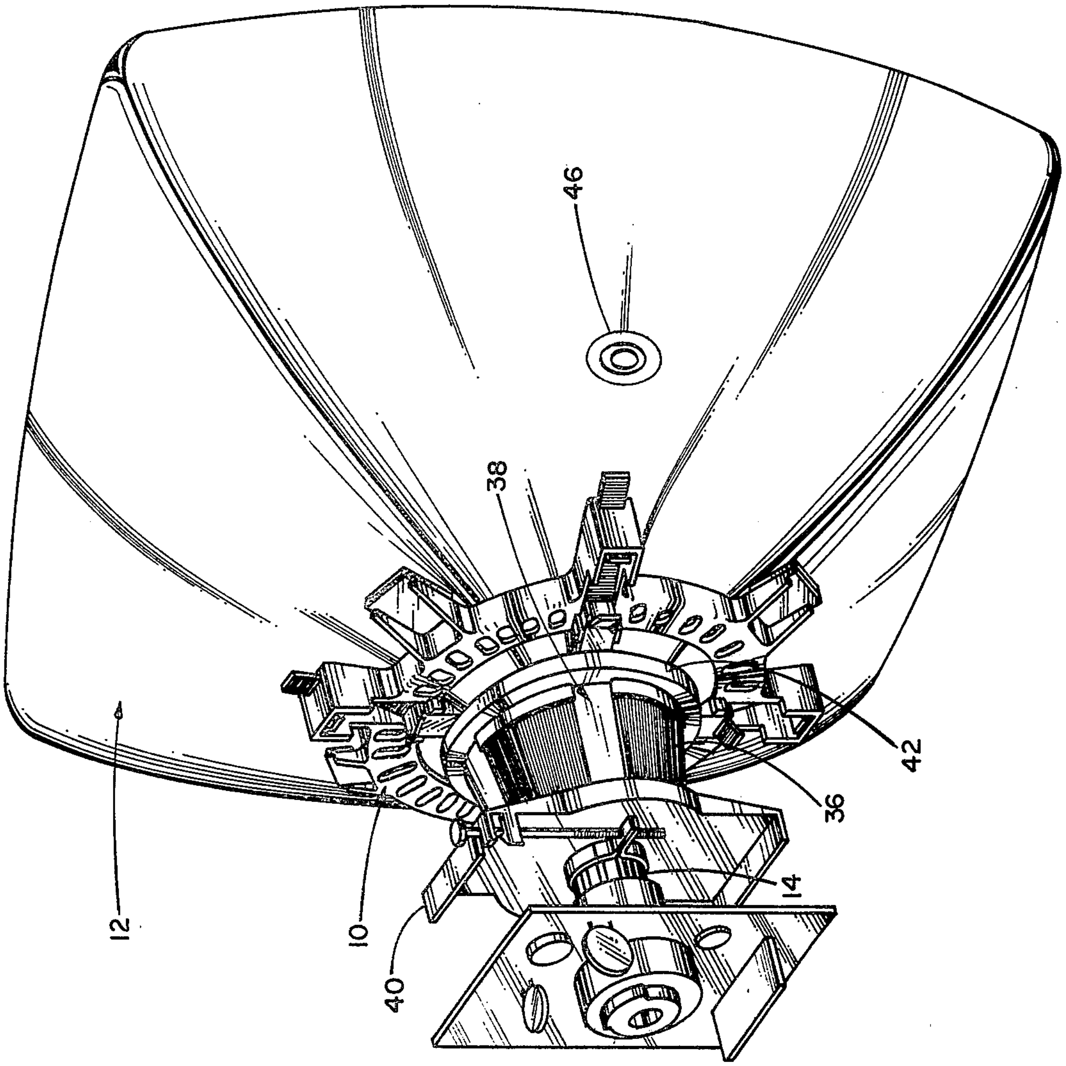
FIG. 1 is a perspective view of a color television picture tube utilizing a yoke adjusting apparatus constructed according to a preferred embodiment of the present invention.
Figure 2:
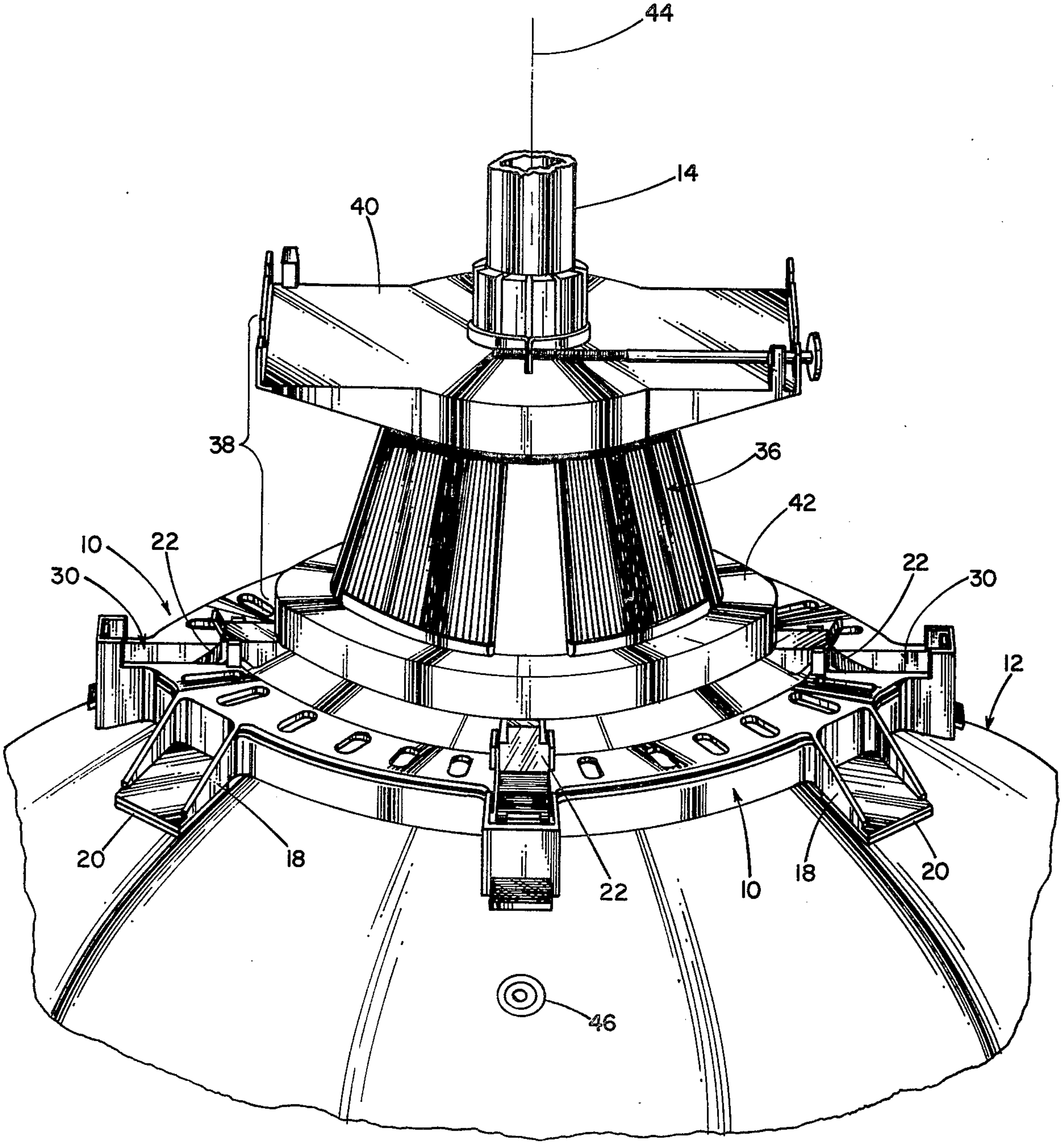
FIG. 2 is a perspective view of the FIG. 1 apparatus and funnel, showing the novel yoke adjusting apparatus in position on the flared position of the picture tube funnel.
Figure 3:
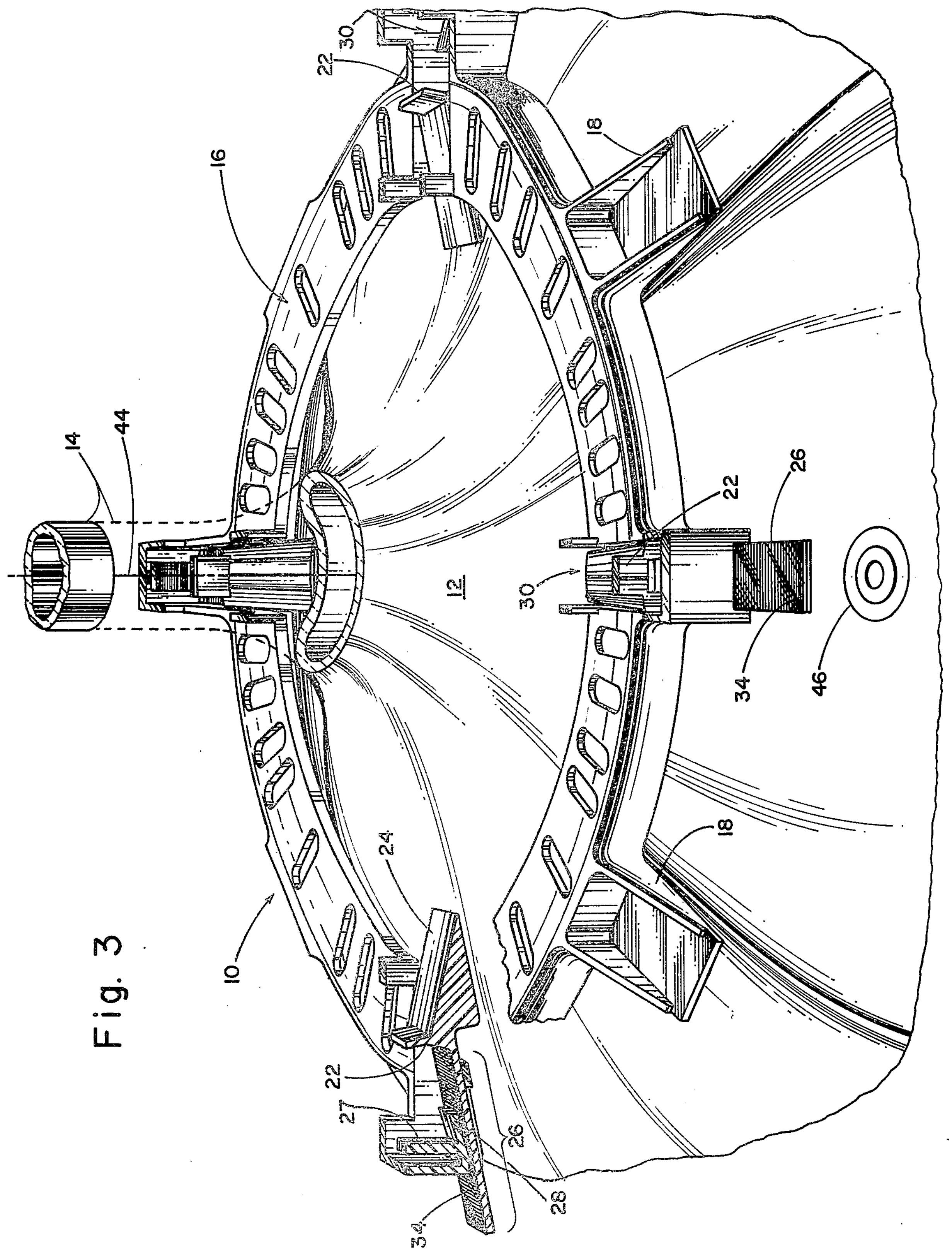
FIG. 3 is an enlarged perspective view, partially sectioned, of the Figures 1–2 yoke adjusting apparatus.

The preferred embodiment will now be described. FIGS. 1–3 show a yoke adjusting apparatus 10 according to this invention attached to a flared portion 12 of a funnel. A circumferential support ring 16 encircles a neck 14 of the funnel. The support ring 16 is preferably a one-piece molded ring as shown. The support ring 16 has feet 18 which rest on the flared position 12 of the funnel. The feet 18 are adhered to the flared portion 12, as with a double sided adhesive foam tape 20.

The support ring 16 carries four tilt adjustment means, here shown as one or more radially inwardly directed sleds 22 having a wedge-shaped front portion 24 and a rear portion 26. The sleds 22 are structured to slide in radial guide means provided on the circumferential support ring 16, here shown as channels 30 formed integrally in the support ring 16.

The locking means is a spring-biased pawl 28, carried by the circumferential support ring 16, and a train of transverse notches 34 located on the rear portion 26 of the sled 22. The pawl 28 engages the train of notches for releasably locking the sled 22 in any selected position on the support ring 16. An arm 27, manually operated, releases the pawl 28 from the notches 34. In the preferred embodiment shown, the rear portion 26 of the sled 22 is flat having the train of transverse notches 34 on its top surface. Other sled locking means could be used. The pawl 28 and arm 27 are preferably integral with the ring 16, as shown.

A rear end 40 of a yoke mount 38, on which is mounted a yoke 36, is clamped to the neck 14. A front end 42 of the yoke mount 38 does not fit tightly about the neck 14 and, therefore, the yoke mount 38 may be tilted with reference to a central axis 44 of the tube. The wedge-shaped front portion 24 of the sled 22 is positioned between the front end 42 of the yoke mount 38 and flared portion 12 of the funnel. By varying the radial position of the sleds 22 in the channels 30, the yoke mount 38 is tilted to adjust the attitude of the yoke 36 and, therefore, the magnitude of the yoke's magnetic field relative to the tube axis 44. By this invention the sleds 22 may be positioned quickly and efficiently and locked in the selected position until at such time it is desired to reposition the yoke mount 38. At that time the sleds 22 can be released from their positions by moving arm 27 which disengages spring biased pawl 28.

In the preferred Figures 1–3 embodiment, adapted for use with an inline electron gun assembly, the channels 30 and corresponding sleds 22 are diametrically opposed and radially orientated on the support ring 16. The support ring 16 is aligned on the flared portion 12 so that the sleds 22 are positioned along the minor and major axes of the funnel mouth. The support ring 16 is aligned with reference to the opening 46 in the flared portion 12 for receiving an anode button. By aligning one sled on the flared portion 12, the three remaining sleds are automatically aligned. Since the support ring 16 is a one-piece unit, the sleds 22 will always remain in the correct orthogonal positions relative to one another.

The invention is not limited to particular details of construction of the embodiment depicted and other modifications and applications are contemplated. Certain changes may be made in the above described apparatus without departing from the true spirit and scope of the invention herein involved. For example, it may not be necessary to use four sleds on the circumferential support. In certain applications three sleds, or even one or two, may be sufficient. It is envisioned that one or more sleds may be permanently attached to the circumferential support with one or more sleds being movable. It is intended, therefore, that the subject matter in the above depiction will be interpreted as illustrative and not in a limiting sense.

What is claimed is:

1. A yoke adjusting apparatus for use with a color television picture tube having a faceplate and a funnel aligned on a tube central axis wherein said funnel has a neck which contains an inline electron gun assembly for emitting at least one stream of electrons, said neck being connected to a flared portion ending in a mouth to which said faceplate is attached, said funnel having about said neck near said flared portion a yoke which forms a magnetic field for deflecting said stream of electrons for proper convergence of said tube, said yoke being held by a yoke mount, said yoke adjusting apparatus comprising;

a circumferential support about said funnel neck and attached to said flared portion of said funnel, and a tilt adjusting means carried by said circumferential support and having a wedge-shaped portion selectably positionable between said yoke mount and said flared portion of said funnel to vary the attitude of said yoke mount, and thus said yoke, relative to said tube axis, thereby causing a change in the magnitude of said magnetic field of said yoke relative to said tube axis, and locking means coupled between said tilt adjusting means and said circumferential support for engaging said tilt adjusting means to lock said wedge-shaped portion of said tilt adjusting means in a selected position between said yoke mount and said flared portion of said funnel corresponding to a desired attitude of said yoke, and manually operable means for releasing said locking means to free said tilt adjusting means and thereby enable it to be retracted and the yoke readjusted.

2. The combination defined in claim 1 wherein said tilt adjusting means is a radially inwardly directed sled having a wedge-shaped front portion for insertion between said yoke mount and said flared portion of said funnel, said sled having a rear portion formed to engage said locking means, and wherein said circumferential support has radial guide means for guiding said sled.

3. The combination defined in claim 2 wherein said circumferential support is a one-piece molded ring, and wherein said radial guide means is an integral radial channel formed in said ring.

4. The combination defined in claim 2 wherein said rear portion of said sled has a train of transverse notches formed therein and wherein said locking means is an integral spring-biased pawl carried by said circumferential support for engaging said train of notches on said rear portion of said sled.

5. A yoke adjusting apparatus for use with a color television picture tube having a faceplate and a funnel aligned on a tube central axis wherein said funnel has a neck which contains an inline electron gun assembly for emitting at least one stream of electrons, said neck being connected to a flared portion ending in a mouth to which said faceplate is attached, said funnel having about said neck near said flared portion a yoke which forms a magnetic field for deflecting said stream of electrons for proper convergence of said tube, said yoke being held by a yoke mount, said yoke adjusting apparatus comprising;

a support ring encircling said funnel neck and attached to said flared portion of said funnel, said support ring comprising at least one radially oriented channel formed in said support ring, and a radially inwardly directed sled adapted to be selectively positioned in said channel, said sled comprising a rear portion and a wedge-shaped front portion for insertion between said yoke mount and said flared portion of said funnel to vary the attitude of said yoke mount, and thus said yoke, relative to said tube axis, thereby causing a change in the magnitude of said magnetic field of said yoke relative to said tube axis, and locking means coupled between said sled and said support ring for engaging said sled to lock said wedge-shaped portion of said sled in a selected position between said yoke mount and said flared portion of said funnel corresponding to a desired attitude of said yoke, and manually operable means for releasing said locking means to free said sled, and thereby enable it to be retracted and the yoke readjusted.

6. The combination defined by claim 5 wherein said support ring has two or more channels and associated therewith corresponding sled and locking means, said channels and sleds being diametrically opposed on said support ring.

7. A yoke adjusting apparatus for use with a color television picture tube having a faceplate and a funnel aligned on a tube central axis wherein said funnel has a neck which contains an inline electron gun assembly for emitting at least one stream of electrons, said neck being connected to a flared portion ending in a mouth to which said faceplate is attached, said funnel having about said funnel neck near said flared portion a yoke which forms a magnetic field for deflecting said stream of electrons for proper convergence of said tube, said yoke being held by a yoke mount, said yoke adjusting apparatus comprising:

a one-piece molded support ring encircling said funnel neck and attached to said flared portion of said funnel, said support ring comprising four diametrically opposed, radially oriented channels formed in said support ring, said channels being positioned along minor and major axes of said funnel mouth;

a radially inwardly directed sled adapted to be selectably positionable in each of said channels, said sled comprising a flat rear portion having a train of transverse notches formed therein and a wedge-shaped front portion for insertion between said yoke mount and said flared portion of said funnel;

a spring-biased pawl integral with said support ring for engaging said train of notches on said rear portion of said sled and for locking said wedge-shaped portion of said sled in a selected position between said yoke mount and said flared portion of said funnel corresponding to a desired attitude of said yoke, thereby causing a change in the magnitude of said magnetic field of said yoke relative to said tube axis; and a manually operable arm integral with said pawl for releasing said pawl from said rear portion of said sled to free said sled and thereby enable it to be retracted and said yoke readjusted.

* * * * *